United States Patent [19]
Schneier

[11] 3,787,829
[45] Jan. 22, 1974

[54] DEPLETED LIQUID SUPPLY INDICATOR

[75] Inventor: Michael Lawrence Schneier, Pittsford, N.Y.

[73] Assignee: Sybron Corporation, Rochester, N.Y.

[22] Filed: July 3, 1972

[21] Appl. No.: 268,716

[52] U.S. Cl. .............................. 340/244 A, 222/66
[51] Int. Cl. ........................................... G08b 21/00
[58] Field of Search ....... 340/244 A; 222/40, 51, 66

[56] References Cited
UNITED STATES PATENTS

| | | | |
|---|---|---|---|
| 932,153 | 8/1909 | Martin | 222/66 |
| 3,305,132 | 2/1967 | Coja | 222/66 |
| 3,242,474 | 3/1966 | Gast et al | 272/51 X |

*Primary Examiner*—Donald J. Yusko
*Assistant Examiner*—Daniel Myer
*Attorney, Agent, or Firm*—T. B. Roessel

[57] ABSTRACT

Means for indicating when a liquid supply, such as a drum or like container, is depleted. The means includes a chamber which houses a level indicator, the chamber having an inlet and an outlet. The chamber is arranged so that its inlet communicates adjacent the bottom of the drum. Liquid is then pumped from the drum through this chamber, so as to maintain the chamber filled while the drum is being emptied. When the liquid supply in the drum is sufficiently depleted, continued pumping results in at least partial emptying of the chamber, which in turn activates the level sensor to indicate that the supply has been depleted.

6 Claims, 4 Drawing Figures

DEPLETED LIQUID SUPPLY INDICATOR

BACKGROUND OF THE INVENTION

The present invention relates to means for sensing when a liquid supply is depleted. More specifically, the present invention relates to such a sensor which permits substantially complete depletion of the liquid supply before signalling the existence of a "low level".

In many instances, a pump is used to remove liquid from barrels, drums and like containers. It is often necessary to maintain a substantially constant supply so that various means have been provided for indicating when the level of liquid in the container has reached a low point requiring the connection of the pump to a new, filled container. One drawback of such level indicators is that they do not permit complete or substantially complete depletion of the liquid in the container before signalling the existence of a low level. It should be appreciated that in the case of relatively large containers, such as 55 gal. drums and the like, even one or two inches of liquid left in the bottom of the container, when the container is discarded, represents a loss of a substantial amount of liquid.

The low level indicator of the present invention permits substantially all of the liquid to be pumped from the containers before signalling the existence of a low level. One embodiment of the present invention permits depletion of the liquid in a drum to a level of one quarter inch or less (¼inch or less) before a low level signal is given.

SUMMARY OF THE INVENTION

The present invention provides a housing enclosing a chamber; a level sensor in the chamber; a first tube extending from adjacent the bottom of the liquid container to the chamber; and a second tube extending from the chamber to the inlet of a pump. With this arrangement, the chamber is in the direct flow path from the liquid source to the pump and remains filled with fluid so long as the inlet of the first tube remains below the level of liquid in the container. After the level in the container falls below the inlet of the first tube, i.e., when the container is substantially empty, the liquid level in the chamber drops and only then does the sensor signal a low level.

In another embodiment of the invention, the housing is an elongated tube having its lower end open and disposed adjacent the bottom of the liquid container, with the level sensor located in the housing adjacent this open lower end. A check valve in the upper end of the tube allows air to escape as the tube is inserted down into the liquid container, which in turn allows the liquid level to rise within the tube actuating the level sensor. As liquid is pumped out of the container and the level in the container drops, a partial vacuum formed at the top of the tube maintains a liquid column in the tube. When the level in the container falls below the open bottom of the tube, air enters the tube and allows the liquid column to run from the tube. The emptying of the tube causes the level controller to give a low level signal.

DESCRIPTION OF THE PREFERRED EMBODIMENTS

Figure 1:
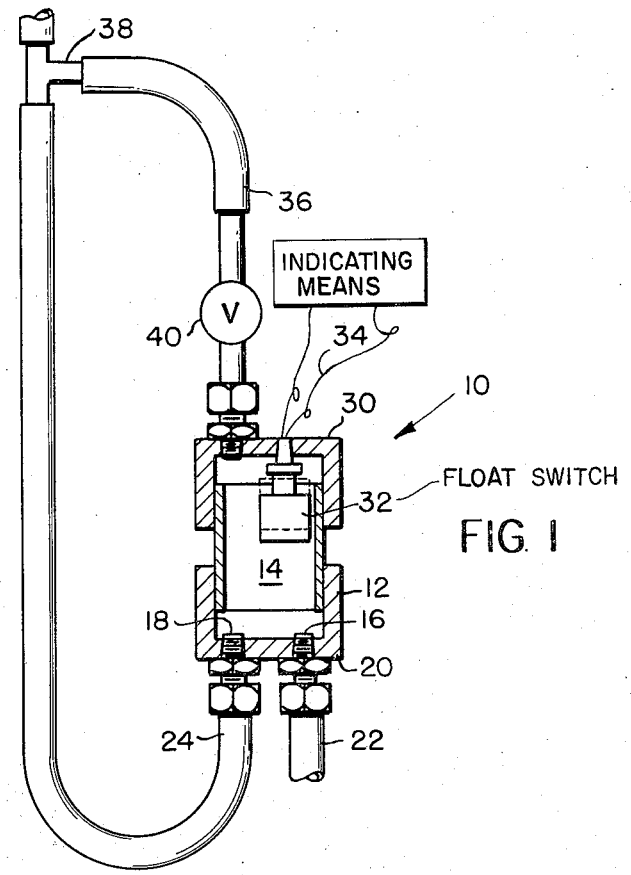
FIG. 1 is a view partly broken away and in section showing one embodiment of the low level indicator of the present invention.

Referring to the drawings, FIG. 1 shows the level indicator of the present invention generally indicated at 10. The indicator includes a generally upright housing member 12 enclosing a chamber 14. A liquid inlet and a liquid outlet 16 and 18 respectively communicate with the chamber through the bottom 20 of the housing. Connected to the inlet and outlet by any suitable means, such as the threaded couplings shown, are an inlet pipe 22 and an outlet pipe 24. It should be appreciated that while only a portion of inlet pipe 22 is shown in FIG. 1, this pipe, which could be of any suitable material, such as a flexible plastic tube, is adapted to extend down into a liquid container 26 to a point adjacent the bottom of the container. This is shown schematically in FIG. 2.

Figure 2:
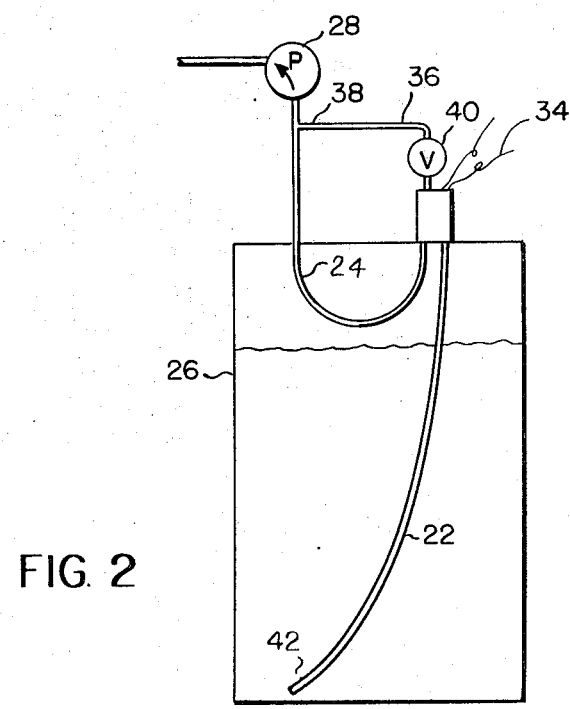
FIG. 2 is a schematic view showing the indicator of FIG. 1 in association with a liquid container.

Outlet tube 24 extends in a U-shape from the bottom of the housing and then upwardly to connect to the inlet of a pump 28 (FIG.2).

Suspended from the top 30 of the housing is a liquid level sensor 32. The sensor itself is a conventional item and, for example, may be a simple float device which moves to the position shown in dotted line when chamber 14 is filled and moves to the position shown in solid line when the liquid level drops in the chamber. Extending from the liquid level sensor are wires 34 which can be connected to any suitable indicating means, such as a signal light, alarm, or the like.

Also communicating with chamber 12, through the top of the housing, is a priming tube 36. This tube may be connected to the housing with any suitable means, such as the threaded couplings shown in FIG. 1. End 38 of the tube, remote from the housing, is tapped into the outlet tube 24. Provided between this point and the housing is a valve 40.

During operation of the embodiment shown in FIGS. 1 and 2, liquid level indicator 10 is substantially vertically oriented in any convenient location. For example, it may rest directly on top of the liquid container 26, as shown in FIG. 2, or it could be located remote from the container. Tube 22 is placed into the container so that the lower end 42 of the tube is adjacent or rests on the bottom of the container. Valve 40 is opened, and pump 28 started. This draws liquid from the container up through tube 22, and into chamber 14. Liquid in the chamber will flow over into outlet 18, and down into the U-shape of tube 24. This continues until air has been evacuated from the top of chamber 14 through the priming tube, the chamber is completely filled with liquid, and the liquid rises in both prime tube 36 and outlet tube 24 past the connection at 38.

Valve 40 is then closed and the pump allowed to operate as desired.

When liquid container 26 is substantially empty, or at least the level of liquid falls below the lower end 42 of tube 22, some liquid will still remain in chamber 14. However, continued operation of the pump will drop the level of liquid in the chamber. This moves liquid level sensor 32 to the position shown in solid line in FIG. 1 so that the switch provided by level sensor 32 can close a circuit to the indicating means for sending a low level signal through wires 34 to the indicating means. Thus, as set out hereinabove, the sending of a low level signal occurs only after the liquid container is substantially empty. Indicator 10 can then be relocated simply by drawing tube 22 from the empty container and inserting it into a new container after which chamber 14 is reprimed as set out hereinabove.

Figure 3:
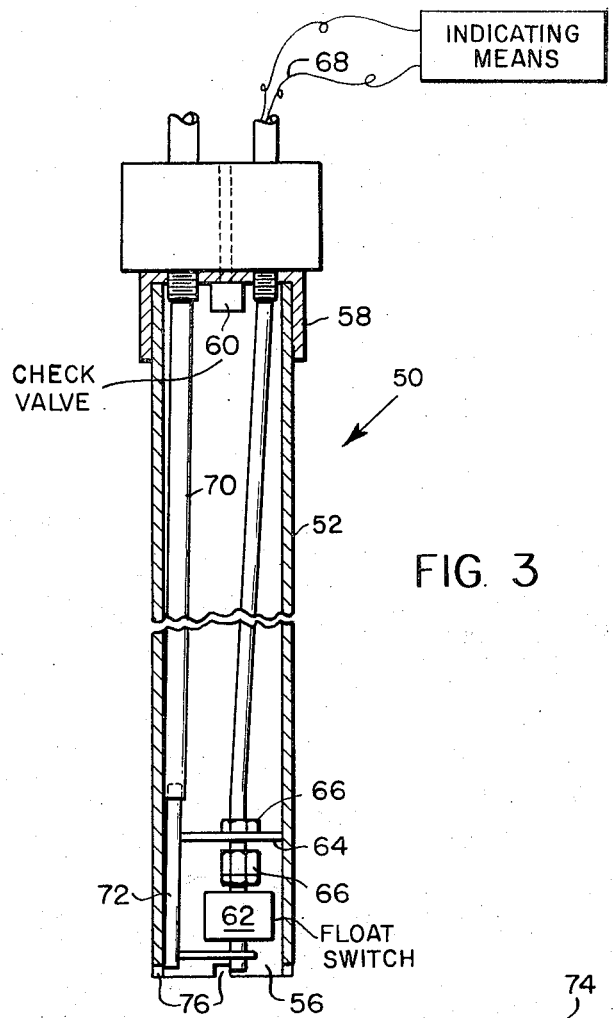
FIG. 3 is a view similar to FIG. 1 showing another embodiment of the present invention.
Figure 4:
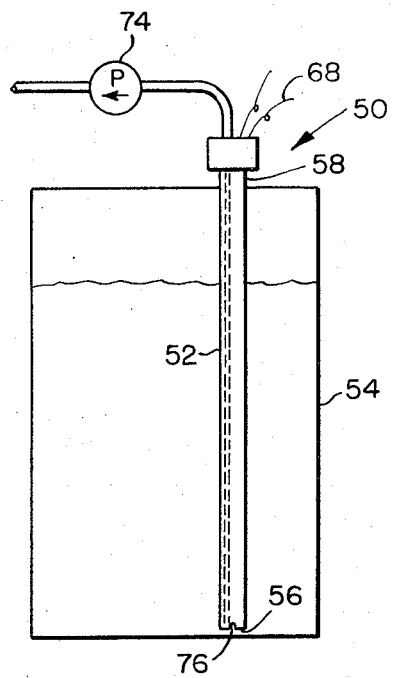
FIG. 4 is a schematic view showing the embodiment of FIG. 3 in association with a liquid container.

The embodiment as shown in FIGS. 3 and 4 is particularly suited for larger containers, such as 55 gal. drums and barrels. As shown in FIG. 4, for example, the level indicator generally indicated at 50 includes a tube member 52 which extends down into a drum 54 with the lower end 56 of the tube being open and positioned closely adjacent the bottom of the drum. The uppermost end 58 of the tube is provided with a check valve 60 (FIG. 3). This allows air to escape and the liquid to rise in the tube as the tube is lowered into the drum.

Carried within the tube adjacent its lower end is the level sensor 62. The sensor is maintained in the lower portion of the tube by any suitable means, such as the flange and threaded fittings 64, 66 respectively. The lead wires from the level sensor are shown at 68. These extend up through tube 52 and are connected to any suitable indicating means, such as a light, buzzer or the like. The opening through which these wires pass in the top 58 of tube 52 is made air tight.

Also disposed within tube member 52 is an inlet pipe 70. This pipe has its lower end 72 disposed just above the lower end of the tube. The other end of inlet pipe 70 is connected to a pump 74 (FIG. 4). The opening in the top 58 of tube 52 permitting the passage of this pipe 70 is also made air tight.

In operation, as tube 52 is inserted down into a liquid container such as drum 54, check valve 60 permits air to escape to allow the level of liquid to rise within the tube. When the pump begins operating, and the liquid level drops in drum 54, a partial vacuum is formed adjacent the top of tube 52, so that the column of liquid within the tube is maintained even as the level of liquid in the drum drops. Thus, so long as the lower end 56 of tube 52 is below the level of liquid in the drum, a column of liquid will be maintained in the tube. As the level of liquid in the drum drops below open end 56, air enters and bubbles to the top of the tube. This allows a portion of the liquid within the tube to drop back into the drum until the level of liquid in the drum is again over end 56. This process is repeated until the level of the column of liquid in tube 52 drops below level sensor 62. At this point, the switch provided by level sensor 62 is closed for completing the circuit through wires 68 to the indicating means.

Preferably, end 56 of the tube should be located closely adjacent or against the bottom of container 54. If it is located against the bottom, a slot 76 may be provided to facilitate the passage of liquid.

It should be noted that since the lower end 72 of the pump inlet tube 70 terminates just short of the lower end of tube 52, liquid from the drum is pumped first into tube 52, and then into inlet pipe 70, so that level sensor 62 is in the flow path to the pump. With the arrangement shown in FIG. 3, it is possible to deplete a container such as a drum or barrel to within less than ¼ inch of the bottom before a low level is signalled.

Thus, it should be appreciated that the present invention accomplishes its intended objects in providing a low level indicator which permits substantially complete depletion of the liquid in a vessel or container before a low level signal is given.

Having thus described the invention in detail, what is claimed as new is:

1. A depleted liquid supply indicator comprising:
   a. an elongated upright tubular member having its lower end open, said member adapted to extend down into a liquid supply container so as to locate said lower end adjacent the bottom of said container;
   b. valve means in the upper end of said member permitting escape of air from said member as said member is inserted down into said liquid supply and liquid rises in said member, said valve means preventing entry of air into said member as said liquid supply is depleted, so that a column of liquid is maintained in said tubular member;
   c. a level sensor in the lower portion of said tubular member for providing an indication of the existence of a low liquid level in said tubular member;
   d. a pump inlet pipe within said tubular member, said pipe having its intake located within said member adjacent said liquid level sensor and said pipe running up said tubular member through the top thereof for connection to a pump, the passage of said pipe through the top of said member being air tight; and
   e. said liquid column being slowly depleted when the level of said liquid supply falls below said open lower end and air enters said member, whereby said sensor gives a low level signal when said liquid column is substantially depleted.

2. A depleted liquid supply indicator as set forth in claim 1, in which said pipe intake is located in said tubular member below the level of said sensor.

3. A depleted liquid supply indicator as set forth in claim 1, in which the wall of said tubular member is provided with at least one liquid passage adjacent its lower end to facilitate passage of liquid into and out of said tubular member.

4. A depleted liquid supply indicator comprising:
   a. a housing defining a chamber;
   b. an intake tube communicating with said chamber through the bottom of said housing and adapted to extend into said liquid supply to a point adjacent the bottom thereof;
   c. an outlet tube communicating with said chamber through the bottom of said housing, said outlet tube extending downwardly and then upwardly above said housing to form a generally U-shaped, one end of said outlet tube being adapted to connect to a pump for pumping liquid from said liquid supply through said chamber;
   d. a priming tube having one end communicating with said chamber through the top of said housing and a second end communicating with said outlet tube at a point above said housing;
   e. valve means in said priming tube which is opened to connect the top and bottom of said chamber with said pump for priming said chamber and closed to establish flow through said chamber from said intake tube to said outlet tube; and f. a level sensor in said chamber for providing an indication of the existance of a low liquid level in said chamber.

5. A depleted liquid supply indicator comprising:
a. a housing enclosing a chamber:
b. a liquid intake tube communicating with said chamber through the bottom of said housing, said intake tube being adapted to extend from said housing and down into a liquid supply container so as to locate the lower end of said intake tube adjacent the bottom of the liquid supply container;
c. a generally U-shaped outlet tube having one leg communicating with said chamber through the bottom of said housing and a second leg adapted for connection to a pump, a portion of said second leg rising above the level of said housing;
d. means communicating with said chamber through the top of said housing for priming said chamber so that said chamber remains filled with liquid until the liquid level in the supply container falls below the lower end of said intake tube; and
e. a level sensor in said chamber; and
f. indicating means acting responsive to said level sensor for indicating the existence of a low liquid level in said chamber.

6. A depleted liquid supply indicator as set forth in claim 5, wherein said means comprises a priming tube having one end communicating with said chamber through the top of said housing and a second end communicating with said outlet tube at a point above said housing top; and valve means in said priming tube, said valve being open for completely filling said chamber with liquid and said valve thereafter being closed to maintain said prime until said liquid supply is depleted.

* * * * *